United States Patent
Ziemkiewicz et al.

(10) Patent No.: US 11,169,426 B2
(45) Date of Patent: Nov. 9, 2021

(54) LIQUID CRYSTAL WAVEGUIDE WITH SUB-APERTURE LIGHT COUPLING

(71) Applicant: Analog Devices, Inc., Wilmington, MA (US)

(72) Inventors: Michael Ziemkiewicz, Lakewood, CO (US); Michael Howard Anderson, Lyons, CO (US); Tyler Adam Dunn, North Reading, MA (US); David Edward Fish, Littleton, CO (US); Scott Dennis Rommel, Lakewood, CO (US); Andrew William Sparks, Arlington, MA (US); Scott Robert Davis, Denver, CO (US)

(73) Assignee: Analog Devices, Inc., Wilmington, MA (US)

( * ) Notice: Subject to any disclaimer, the term of this patent is extended or adjusted under 35 U.S.C. 154(b) by 163 days.

(21) Appl. No.: 16/358,529

(22) Filed: Mar. 19, 2019

(65) Prior Publication Data
US 2020/0301240 A1    Sep. 24, 2020

(51) Int. Cl.
*G02F 1/295*    (2006.01)

(52) U.S. Cl.
CPC ........ *G02F 1/295* (2013.01); *G02F 2201/302* (2013.01); *G02F 2202/32* (2013.01); *G02F 2203/24* (2013.01)

(58) Field of Classification Search
None
See application file for complete search history.

(56) References Cited

U.S. PATENT DOCUMENTS

| | | | | |
|---|---|---|---|---|
| 3,982,810 A | * | 9/1976 | Tamir | G02B 6/34 385/37 |
| 5,033,812 A | * | 7/1991 | Yoshida | G02B 6/34 385/37 |
| 6,043,861 A | * | 3/2000 | Davis | G02F 1/1326 349/115 |
| 6,738,551 B2 | | 5/2004 | Noda et al. | |

(Continued)

OTHER PUBLICATIONS

Alagappan, G., et al., "Out-of-plane diffraction of a two-dimenisonal photonic crystal with finite dielectric modulation", Journal of the Optical Society of America, vol. 25, No. 5, (May 2008), 6 pgs.

(Continued)

*Primary Examiner* — Phu Vu
(74) *Attorney, Agent, or Firm* — Schwegman Lundberg & Woessner, P.A.

(57) ABSTRACT

A Liquid Crystal Waveguide (LCW) system can provide sub-aperture incoupling or outcoupling of light having an input wavelength and input beamsize defining an aperture characteristic of the system. A Liquid Crystal Waveguide (LCW) can include a generally planar LCW core to receive light via a light input zone for communication toward a light output zone. Sub-aperture interfacial light couplers can be planarly arranged in or parallel to the planar LCW core in the light input zone or the light output zone. Sub-aperture interfacial light couplers can include teeth, prisms, or facets, a photonic crystal metasurface, or a geometric-phased holograph (GPH)). Overall LCW thickness can be reduced, which can be helpful in space-limited applications or for reducing material costs.

19 Claims, 14 Drawing Sheets

(56) References Cited

U.S. PATENT DOCUMENTS

| | | |
|---|---|---|
| 7,483,466 B2 | 1/2009 | Uchida et al. |
| 9,983,355 B1* | 5/2018 | Davis .................. G02B 6/2713 |
| 2019/0121004 A1* | 4/2019 | Ahmed .............. G02B 27/0172 |

OTHER PUBLICATIONS

Boroditsky, M., et al., "Light extraction from optically pumped light-emitting diode by thin-slab photonic crystals", Appl. Phys. Lett., 75(8), (Aug. 2009), 1036-1038.

Chen, X., et al., "Silicon Waveguide Grating Couplers with Engineered Coupling Strength for Optimized Coupling", European Conference on Integrated Optics, (2010), 2 pgs.

Ding, Yunhong, et al., "On-chip grating coupler array on the SOI platform for fan-in/fan-out of MCFs with low Insertion loss and crosstalk", Optics Express, 23(3), (2015), 8 pgs.

Li, K., et al., "Unidirectionally optical coupling from free space into silicon waveguide with wide flat-top angular efficiency", Optics Express, 20(17), (2012), 12 pgs.

Mehta, Karan K., et al., "Precise and diffraction-limited waveguide-to-free-space focusing gratings", Scientific Reports, 7(1), (May 17, 2017), 8 pgs.

Taillaert, Dirk, et al., "Grating Couplers for Coupling between Optical Fibers and Nanophotonic Waveguides", Japanese Journal of Applied Physics, vol. 45, No. 8A, (2006), 7 pgs.

* cited by examiner

LIQUID CRYSTAL WAVEGUIDE WITH SUB-APERTURE LIGHT COUPLING

TECHNICAL FIELD

This document pertains generally, but not by way of limitation, to optoelectronics, and particularly but not by way of limitation to a liquid crystal waveguide with active light incoupling.

BACKGROUND

A liquid crystal waveguide (LCW) can be used as a beamsteerer for guiding and steering light, such as can be received as an input light beam from a laser. A liquid crystal (LC) material can be used for steering light within or leaving the LCW, such as by applying a voltage to vary a property of the LC material in response to the voltage for steering the light.

SUMMARY

The present inventors have recognized, among other things, that while laser or another light beam can be coupled into or out of a LCW using an obliquely angled facet having a dimensional thickness component (normal to the plane of the LCW) large enough such that the facet size exceeds the component of the beamsize that is normal to the plane of the LCW ("beamsize normal component"), such an arrangement can disadvantageously increase the size and cost of the LCW. Instead of requiring such an oblique facet that is larger than the beamsize normal component, the present document describes, among other things, an approach that can include providing a plurality of sub-aperture (e.g., smaller than the beamsize) light coupling elements, such as for light coupling into or out of the LCW. Examples of such sub-aperture light coupling elements can include, without limitation, sub-aperture facets, such as in a sawtooth-like arrangement, a subaperture photonic crystal metasurface, or a geometric-phased holograph (GPH)) such as can be arranged parallel to the LCW plane, such as for light coupling into or out of the LCW. This approach of using sub-aperture light coupling elements is capable of reducing the overall thickness of the LCW system, including its light incoupler or outcoupler. Such thickness reduction can potentially be advantageous in space-limited applications or for reducing the material costs of such a device.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A liquid crystal waveguide (LCW) can be used as a beamsteerer for guiding and steering light, such as can be received as an input light beam from a laser. A liquid crystal (LC) material can be used for steering light within or leaving the LCW, such as by applying a voltage to vary a property of the LC material in response to the voltage for steering the light.

The present inventors have recognized, among other things, that while laser or another light beam can be coupled into or out of a LCW using an obliquely angled facet having a dimensional thickness component (normal to the plane of the LCW) large enough such that the facet size exceeds the component of the beamsize normal to the plane of the LCW ("beamsize normal component"), such an arrangement can disadvantageously increase the size and cost of the LCW. Instead of requiring such an oblique facet that is larger than the beamsize normal component, the present document describes, among other things, an approach that can include providing a plurality of sub-aperture (e.g., smaller than the beamsize) interfacial light coupling elements, such as for light coupling into or out of the LCW. Examples of such sub-aperture light coupling elements can include, without limitation, sub-aperture facets, such as in a sawtooth-like arrangement, a subaperture photonic crystal metasurface, or a geometric-phased holograph (GPH)) such as can be arranged parallel to the LCW plane, such as for light coupling into or out of the LCW. This approach of using sub-aperture light coupling elements is capable of reducing the overall thickness of the LCW system, including its light incoupler or outcoupler. Such thickness reduction can potentially be advantageous in space-limited applications or for reducing the material costs of such a device.

Some illustrative examples of LCWs are described in: (1) U.S. Pat. Nos. 9,366,938, 9,885,892, 9,829,766, and 9,880,443; (2) U.S. Pat. Nos. 8,311,372 and 8,380,025; (3) U.S. Pat. No. 8,860,897; (4) U.S. Pat. No. 8,463,080; and (5) U.S. Pat. No. 7,570,320, all of which are incorporated herein by reference in their entireties, including for their description of LCWs and uses such as for beamsteering of light, including in-plane and out-of-plane beamsteering. This document explains, among other things, techniques for coupling light into or out of an LCW, such as can be applied to the LCWs and techniques described and shown in this document, or to those described and shown in the above-incorporated documents.

Figure 1:
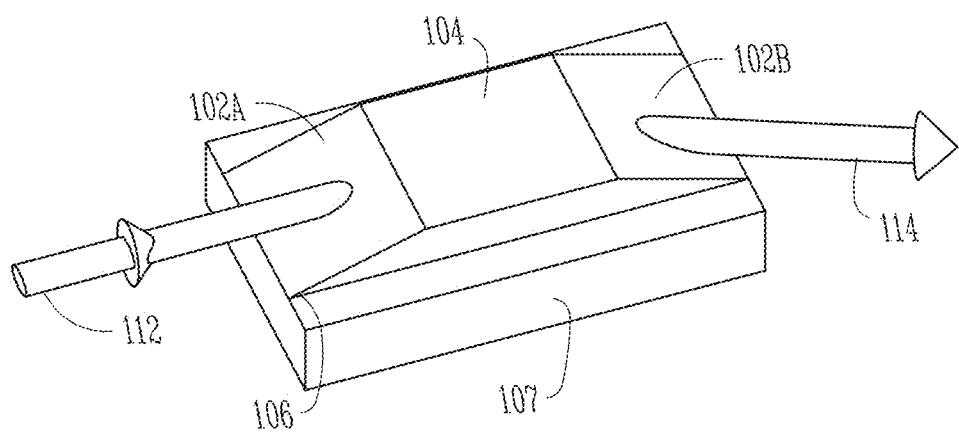
FIG. 1 shows a plan view of an example of a liquid crystal waveguide (LCW) approach with facets (not sub-aperture) in incoupling and outcoupling zones of a silicon or like substrate.
Figure 4:
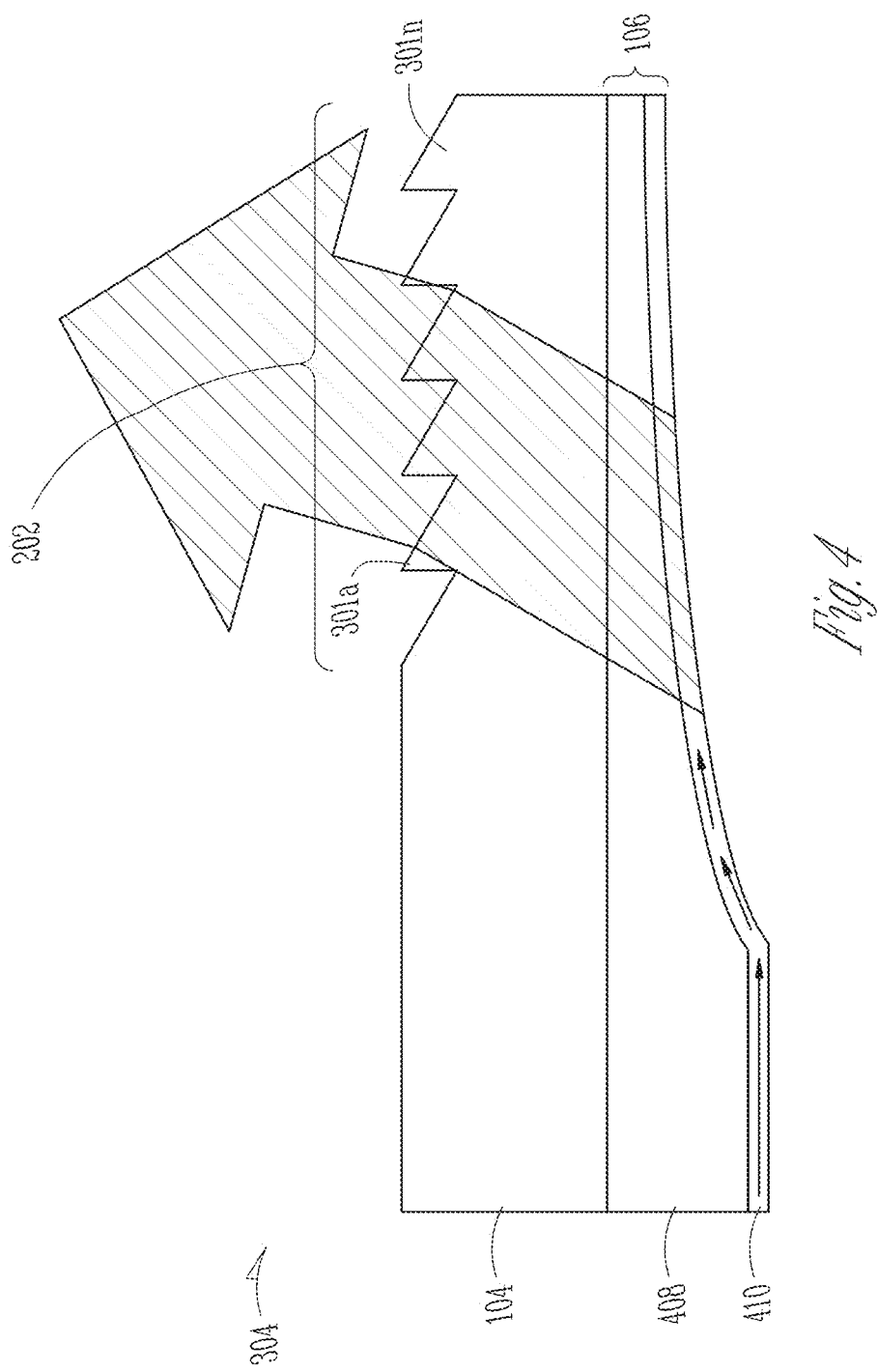
FIG. 4 is a side view that shows an example of an approach in which rows of grating grooves or "teeth" can be cut into a backside of the substrate layer, such as to provide a way for light to escape the substrate when such light strikes the substrate-air interface at an angle that would otherwise lead to total internal reflection (TIR).

FIG. 1 shows a plan view of an example of a liquid crystal waveguide (LCW) approach with facets 102 in incoupling and outcoupling zones of a silicon semiconductor or like substrate 104. The substrate 104 can overlay a planar LCW cell 106, which, in turn can rest upon an underlying glass or other mounting block 107 such as can be located on the opposing side of the LCW cell 106. The planar LCW cell 106 can include a subcladding 408 and a generally planar Liquid Crystal (LC) core 410, such as shown in FIG. 4. The subcladding 408 thins in locations underlying the incoupling and outcoupling zones of the substrate 104, such as to allow light passage through the subcladding 408 in such zones. The inner surfaces of the substrate 104 and the mounting block 107 can be coated or implanted with one or more layers, such as for creating the optical and electronic conditions desired to provide LCW performance.

In the example of FIG. 1, the facets 102 are obliquely angled with respect to a longitudinal direction of the planar LCW cell, such as with a continuous planar facet 102 sized large enough to accommodate an entire diameter or beamsize normal component of the incoupled light beam 112 or outcoupled light beam 114. However, this presents a potential disadvantage in requiring enough thickness of the substrate 104 to permit the entire projected beamwidth of incoupled laser or other light beam to be incident on the contiguous planar input facet 102a, and to permit the entire projected beamwidth of the outcoupled light beam to emanate from the contiguous planar output facet 102b. Such a thickness requirement in the normal direction to the LCW plane can pose undesirable size and cost constraints.

As shown in the example of FIG. 1, two continuous planar facets 102 can be cut into the substrate 104 near Brewster's angle for air (or other light entrance or exit adjacent medium) and for the material of the substrate 104. These facets 102 can serve as high efficiency light entrance and exit windows at the substrate-air interface. When "Ulrich coupling" is used to transfer light from the substrate 104 to the LC waveguide core 410, the facets 102 are needed because the LCW physics need total internal reflection (TIR) to occur when the laser beam strikes the substrate-LC interface from the substrate 104 side in the region of the LC waveguide core 410. Since the index of refraction of air is lower than the index of refraction of any LC layer, light must also undergo TIR at a parallel substrate-air interface. Therefore, light can only properly enter or exit the substrate 104 by cutting the facets 102 to change the angle at which the laser strikes the substrate-air interface. In the continuous planar facets 102 approach shown in FIG. 1, it is also necessary to make the substrate 104 thick enough to allow entering or exiting laser beamwidth normal components to respectively fit on the corresponding continuous planar facets 102a-b. This increases the overall cost to produce an LCW device, for example, because it requires more substrate material and because it necessitates fabrication equipment that is capable of handling thick wafers.

Figure 2:
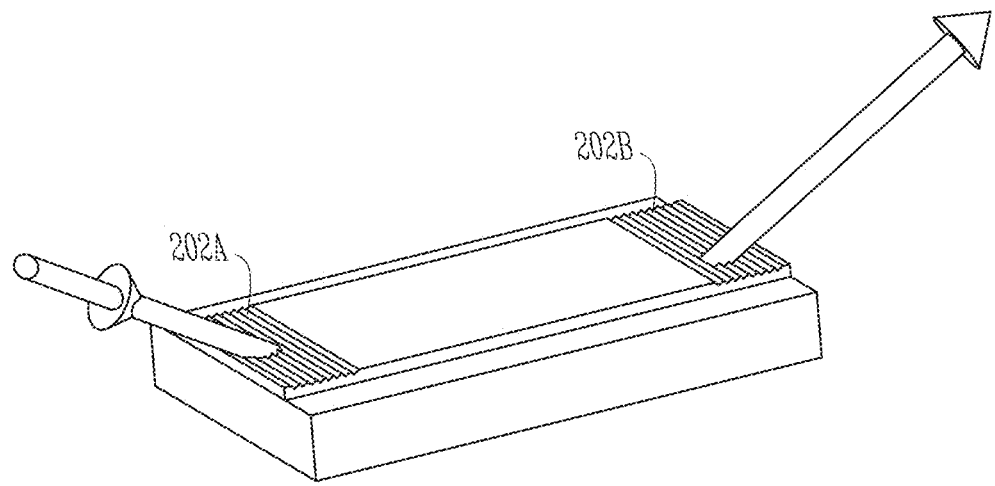
FIG. 2 shows a plan view of an example of another approach of a beamsteering LCW including sub-aperture interfacial light couplers, such as can be arranged in periodic topographical rows.

FIG. 2 shows a plan view of an example of another approach of a beamsteering LCW in which one or both of the facets 102 can be replaced with a substantially planar or sheet-like plurality 202 of individual sub-aperture interfacial light couplers, such as can be arranged in periodic topographical rows, such as can be arranged along a base plane that can be parallel to and offset from the generally planar LCW core 410 or the planar LCW cell 106, and respectively associated with one of the light input zone of the LCW 106 or the light output zone of the LCW 106. In FIG. 2, rather than refractively entering and exiting the substrate 104 via larger-than-beamwidth contiguous planar facets 102, laser or other light can be coupled into the substrate 104 or out of the substrate 104 via the plurality 202 of sub-aperture (individually smaller-than-beamwidth) interfacial light couplers. For example, the planar plurality 202 of sub-aperture interfacial light couplers can include a grating such as can provide a substantially planarly arranged topographical series of sub-aperture facets 302 such as can be used for interfacial incoupling or outcoupling of light, such as shown in the outcoupling example of FIG. 3.

Figure 3:
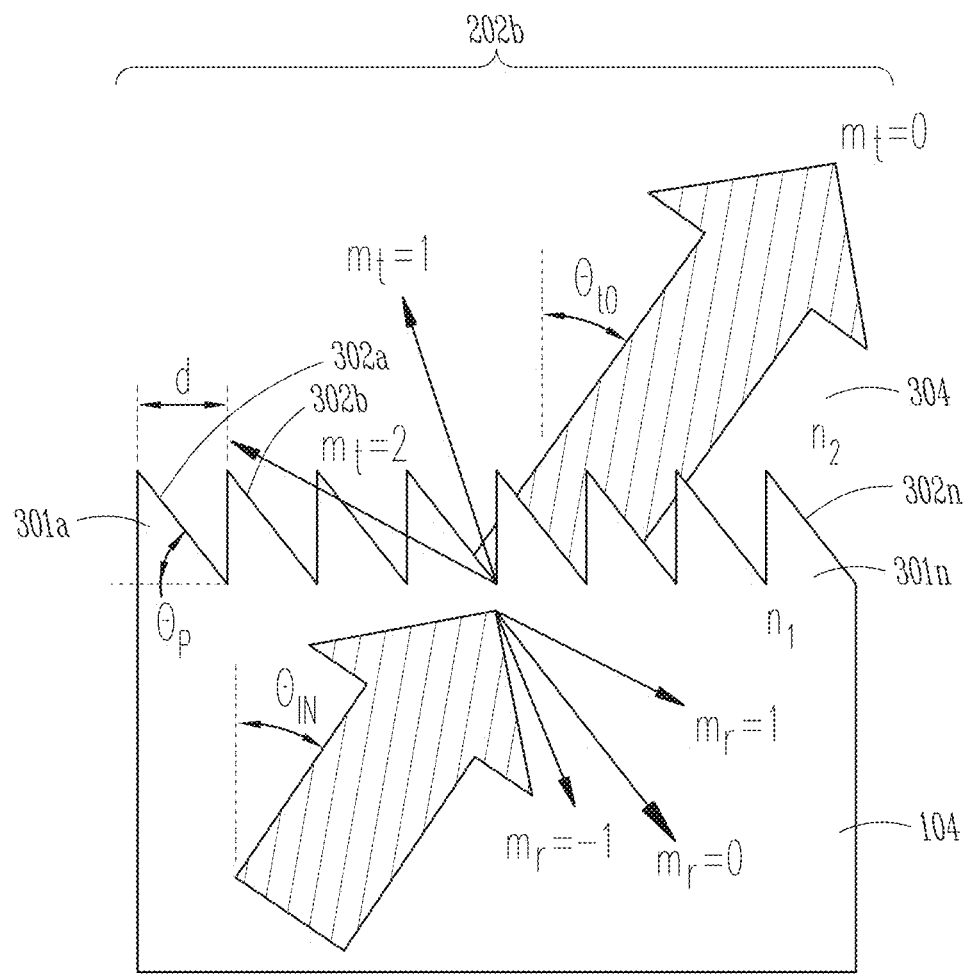
FIG. 3 shows an outcoupling example for a beam originating in the substrate, in which the grating redirects the incident light beam into several smaller beam components, which can be referred to by their "order".

FIG. 3 shows a side view of an example of the planarly arranged topographical series of sub-aperture grating prisms or teeth 301a ... 301n, respectively providing facets 302a ... 302n, such as can form a planar topographical arrangement of rows with a separation spacing, d, that can be less than the beam diameter, beam peripheral outline, or other cross-sectional or other lateral incidence or exit dimension ("beamwidth") of the laser beam, or compared to the range of positions over which the laser beam travels (since the laser beam may be obliquely incident upon a particular field of regard (FOR) such as upon the planarly arranged a series of sub-aperture facets 302a ... 302n and, therefore, the effective beamwidth of the obliquely incident beam peripheral outline may be larger than the effective beamwidth of the beam diameter taken cross-sectionally perpendicular to the beam).

In the example shown in FIGS. 2-3, the beam peripheral outline of the exiting (or entering) light beam is shown as being distributed across multiple facets 302A ... 302N, such that these facets 302A ... 302N can be regarded as sub-aperture, e.g., with the beam peripheral outline defining an "aperture." In an example, the planarly arranged topographical series of sub-aperture facets 302a ... 302n can form individual rows with a separation spacing, d, between such rows that is small compared to the beam diameter, beam peripheral outline, or other cross-sectional or other lateral dimension of the laser beam, defining its beam aperture. Geometrically, the approach shown in FIGS. 2-3 allows for a much thinner substrate 104 layer than the contiguous planar facet approach shown in FIG. 1. The much thinner substrate 104 layer of the approach shown in FIGS. 2-3 is enabled by the reduced facet height obtained by making the individual facets 302A . . . 302N sub-aperture using corresponding individual teeth or prisms 301, rather than requiring the entire beam peripheral outline to pass through a single contiguous planar facet 102 such as shown by the approach of FIG. 1.

This document explains and provides examples of, among other things, various embodiments for implementing the planar topographical plurality 202 of sub-aperture interfacial light couplers (e.g., such as can include a sub-aperture faceted grating, a polarization grating, a photonic crystal metasurface, a Geometric Phased Hologram (GPH), or the like) in, or in combination with, an LCW device. This document also discusses approaches to choosing one or more grating or other parameters, such as, for example, to help send as much light as possible into the grating or other planar plurality 202 of sub-aperture interfacial light couplers. This can help increase or maximize an amount of light into the grating or other planar plurality 202 of sub-aperture interfacial light couplers, such as to help reduce or minimize the amount of laser light that may otherwise be wasted in coupling into or out of these devices.

FIG. 2 shows an example in which the planar topographical plurality 202 of sub-aperture interfacial light couplers can include a grating, such as can include a series of grooves or scratches or grating teeth 301 or prisms or the like, such as with a well-defined spacing, d, between periodic rows of such grooves or scratches or grating teeth 301 or prisms or the like.

FIG. 3 shows an outcoupling example for a beam originating in the substrate 104, in which the grating 202b redirects the incident light beam into several smaller beam components, which can be referred to by their "order". In FIG. 3, some orders (e.g., labelled $m_r$) are "reflective", meaning that they travel back into the substrate 104 from its interface with the overlaying region 304 (e.g., air or other material). Some of these smaller beam components (e.g., labelled $m_t$) are transmissive, meaning that they emanate out of the substrate 104 into the overlaying region 304 of air or other material. A grating such as shown in FIG. 3 can operate according to the following principle. Light encounters the grating at an angle $\theta_{in}$ in a substrate 104 material with index of refraction $n_1$. Upon encountering the grating 202b, light is diffracted into a set of different orders. Because the grating 202b is blazed, light is preferentially sent into the desired order.

The angular position of order m is determined by the input beam wavelength, $\lambda$, (which, in practice, need not be limited to a single wavelength, but could include a relatively narrow range or other range of wavelengths) and by the inter-groove spacing, d, such as according to Equation 1, below, in which: $\theta_1$ is an angle of incidence of the light beam in the substrate 104 upon the interface between the substrate 104 and the overlaying region 304, as defined with respect to direction that is normal/orthogonal to the substrate 104; and in which $\theta_2$ is an angle of exit of the light beam component from the interface between the substrate 104 and the overlaying region 304 and into the overlaying region 304, as defined with respect to direction that is normal/orthogonal to the substrate 104.

$$\frac{m\lambda}{d} = n_1 \sin\theta_1 - n_2 \sin\theta_2. \quad (1)$$

In the example shown in FIG. 3, because the index of refraction, $n_1$, of the substrate 104 is higher than the index of refraction $n_2$ of the overlaying region 304 of air, there are more reflective orders $m_r$ than transmitted orders $m_t$ in this case, which can present a light transmission efficiency challenge, such as can be addressed such as explained further herein.

FIG. 4 is a side view that shows an example of an approach in which rows of grating grooves or "teeth" 301 can be cut into a backside of the substrate 104 layer, such as to provide a way for light to escape the substrate 104 when such light strikes the substrate-air interface at an angle that would otherwise lead to total internal reflection (TIR). In this example, light at a particular transmissive order m (see FIG. 3) can be selected for use as the output beam. Conversely, light can be input from air 304 into the grating 202 in the reverse direction along the angle corresponding to such transmissive order m to couple light into the substrate 104, for example, at an angle that can then couple the light from the substrate 104 into the underlying waveguide core 410 of the LCW 106. In this case, the tooth or groove separation spacing d (see FIG. 3) can be selected such that one of the diffracted orders $m_r$ in the substrate 104 matches the angle needed for coupling light from the substrate 104 into the LCW core 410. The waveguide mode can be characterized by an effective refractive index, $N_{eff}$, which is determined by the thicknesses and materials in the LCW stack of the LCW 106. Therefore, tooth spacing d can be chosen so that for some order, m, the following relationship holds:

$$N_{eff} = n_1 \sin\theta_1 = \frac{m\lambda}{d} + n_2 \sin\theta_2. \quad (2)$$

FIG. 4 shows an example of a grating 202 that can be sufficient for enabling the incoupling of some light from air 304 into the waveguide mode within the LCW core 410. However, the efficiency of this process may be limited by a significant amount of the incident light being directed into unwanted orders, that is, orders that do not yield light incoupled into the LCW core 410.

Figure 5:
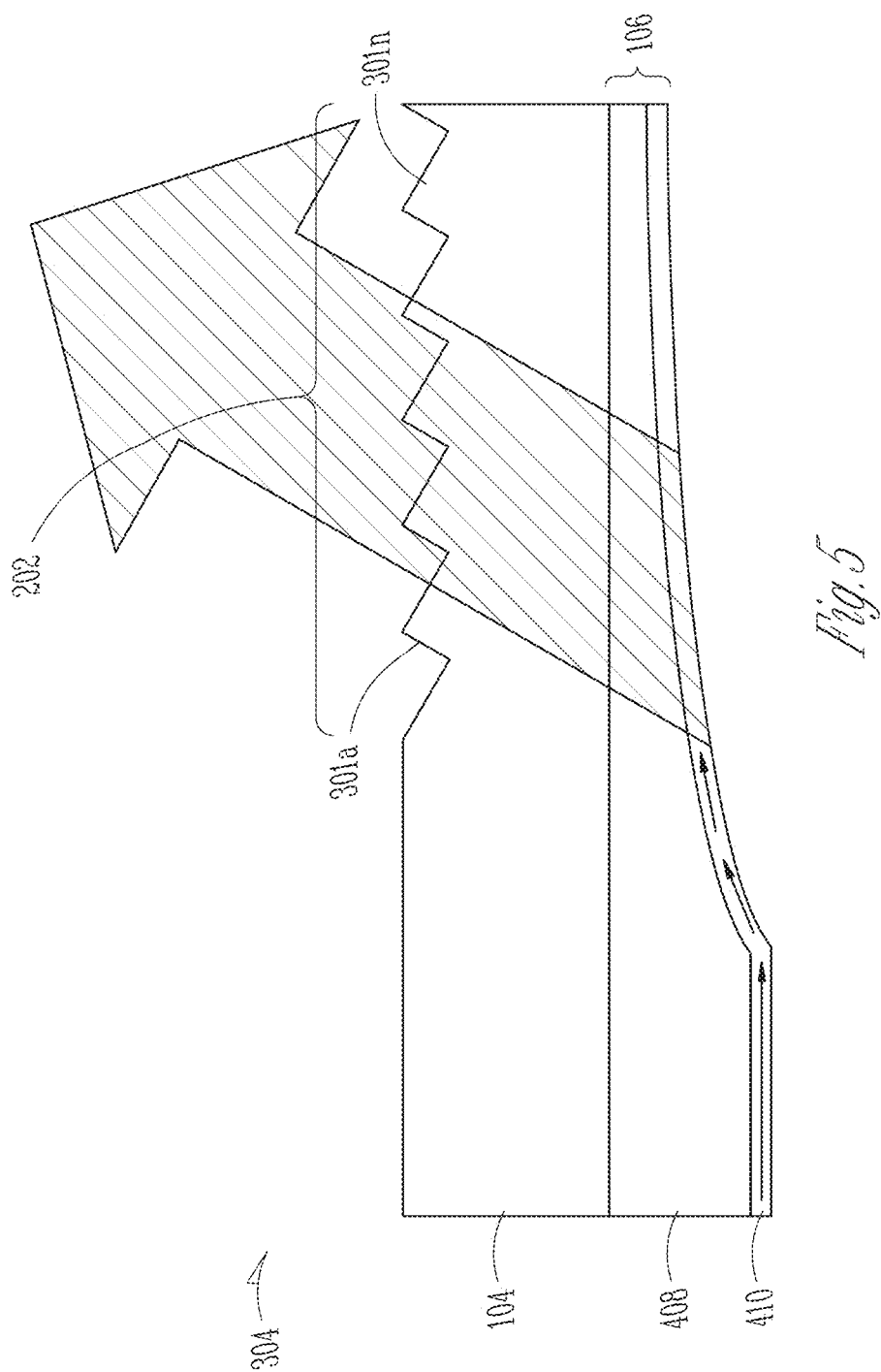
FIG. 5 shows an example of "blazing" the grating 202 such that, at the tooth-air interfaces emanating light is refracted in the same direction as a selected one of the diffracted orders $m_r$.

FIG. 5 shows an example of how this problem can be addressed by "blazing" the grating 202 such that, at the tooth-"air" interfaces emanating light is refracted in the same direction as a selected one of the diffracted orders $m_r$. Although FIG. 5 is described as showing tooth-air interfaces, it is understood that the tooth may interface with another gaseous or other (e.g., solid or liquid) material. In the example shown in FIG. 5, which can be referred to as a "normal blazing" configuration or condition, the teeth 301 can be arranged so that one tooth facet surface is oriented parallel to the direction of incoming (or exiting) light and the other tooth facet surface is perpendicular thereto. Comparing FIGS. 4 and 5, it can be seen that light emanating from the substrate 104 into overlying air 304 under the normal blazing configuration of FIG. 5 will not be obstructed by a non-parallel (to the incoming or exiting light direction) protruding rising edge face of an adjacent tooth 301 such as shown in FIG. 4, since in FIG. 5 one tooth surface has been oriented to a direction parallel to the direction of incoming (or exiting) light, yielding more efficiency in light transmission at the tooth-air interface. Where such tooth surface is not oriented to a direction parallel to the direction of incoming (or exiting) light, avoiding such obstruction (e.g., for exiting light) can involve refracting the light away from such non-parallel rising edges of the teeth, such as the non-parallel rising edges of the teeth 301 shown in the example of FIG. 4. The transmitted light need not be redirected by refraction in the normal blazing condition to avoid obstruction by a rising edge of an adjacent tooth, such as shown in FIG. 5.

In the example of the normal blazing condition shown in FIG. 5, which is configured such that light in the substrate 104 exits at a substrate-air interface that is normal to the direction of the incident light within the substrate, the transmitted light from the substrate 104 into the air 304 will not be redirected by refraction. Therefore, under such a normal blazing condition, blazing configuration considerations can be reduced to selecting the appropriate grating pitch (spacing d) such that the un-deflected (e.g., un-refracted) light beam corresponds to a particular specified diffracted order, $m_r$.

It should be noted that the direction of incident light within the substrate 104 at the substrate-air interface is determined by the characteristics of the LCW 106 itself (e.g., the LCW core 410 and the tapered subcladding 408), which can be approximated or treated as a fixed input to the blazing configuration parameter selection or arrangement.

This fixed input angle of the incident light within the substrate 104 at the substrate-air interface, in turn, can be used to determine or specify the facet angles for the grating teeth 301 such as shown in the examples of FIGS. 3-5. Next, the distance d between individual grating teeth 301 can be selected, such as, according to Equation (2), above. For example, for $\lambda=1.5$ μm, $N_{eff}=1.7$, $\theta_1=\theta_2=30°$, and m=1, the selected value of d is 1.25 μm. A similar blazing condition will also exist when d is larger by any integer multiple of the value of d computed using Equation (2), above. As the spacing d gets larger, more diffractive orders exist, but less diffractive loss is expected to occur over the length of the normal-to-light oriented facet of the grating tooth 301. Therefore, the configuration can be modified to adjust or optimize diffraction at some specific grating order m, such as can be found by an optical computer-based simulation. For a silicon substrate 104, some examples of typical values of the pitch, d, for this type of grating may range from between 0.5 and 20 μm, inclusive, such as with etched depth (e.g., vertical to the substrate 104) of the sawteeth ranging from 0.25 μm and 10 μm, inclusive. Based on optical computer-based simulation for a silicon substrate 104, diffraction efficiencies ranging from 45% to 60%, inclusive, are possible for a specific example of the arrangement shown in FIG. 5 at a light wavelength of 1.5 μm.

For the grating example shown in FIG. 5 at a light transmission loss component is expected due to specular reflection at each grating tooth facet. This is expected to primarily result in a population of the reflected diffracted orders.

Figure 6:
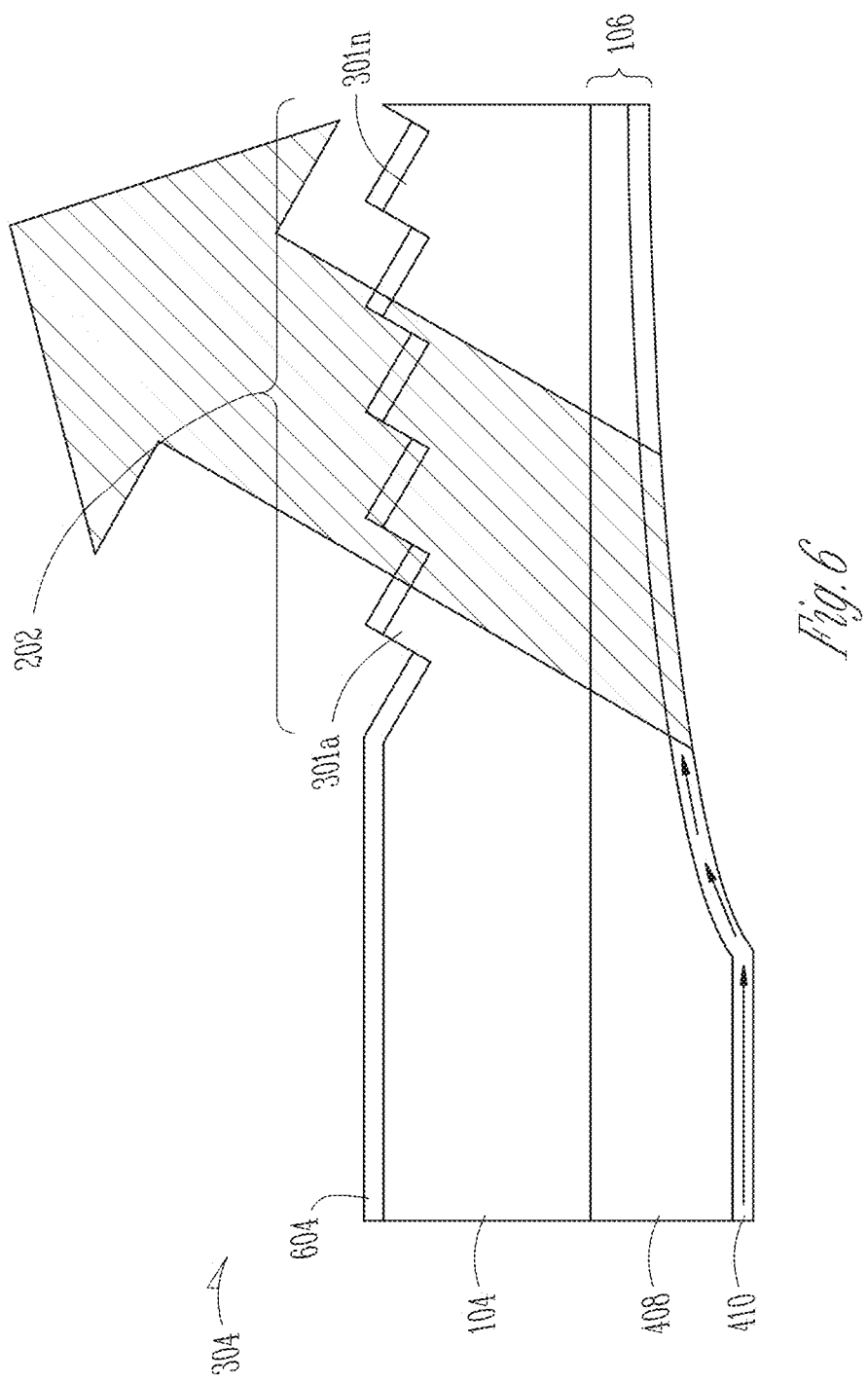
FIG. 6 shows a side view of an example of a technique by which losses due to specular reflection can be reduced or avoided, such as by depositing or otherwise forming an antireflection coating (ARC) layer or region on the normal-to-light oriented facets of respective grating teeth.

FIG. 6 shows a side view of an example of a technique by which such losses due to specular reflection can be reduced or avoided, such as by depositing or otherwise forming an antireflection coating (ARC) layer or region 604 on top of the normal-to-light oriented facets of respective grating teeth 301. The ARC region or layer 604 can include or consist of one or more single or multi-layer coatings, such as can include one or more of a variety of dielectric materials useful in semiconductor processing, such as silicon nitride or silicon dioxide. The particular thickness of the ARC layer 604 can be selected or varied such as to accommodate a specific need. In an illustrative example, such thickness of the ARC layer 604 can be selected to fall within a range between 50 nanometers and 500 nanometers, inclusive, for an ARC coating layer 604 overlaying a silicon substrate 104. With the addition of an ARC layer 604 on the silicon substrate 104, diffraction efficiency for the type of grating shown in the example of FIG. 6 can be improved to provide an efficiency value that is between 65% and 80%, inclusive, as determined based on computer-based optical simulation for a light wavelength of 1.5 μm.

Figure 7:
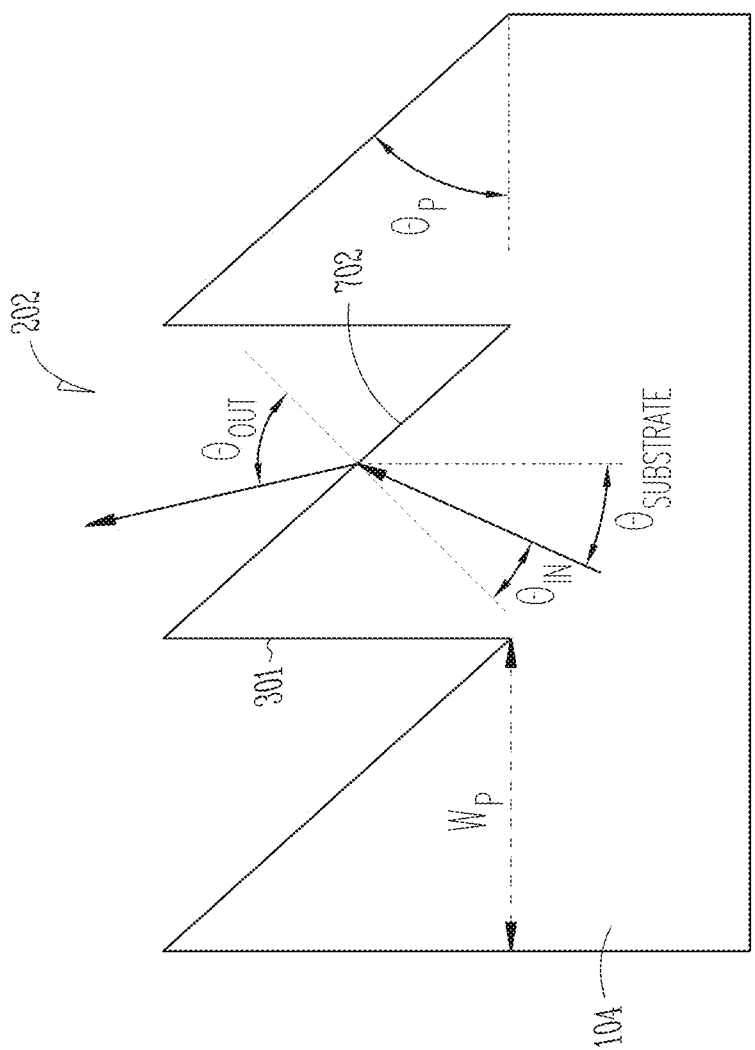
FIG. 7 shows a side view of a conceptualized example of details of an interaction between light exiting the substrate and an individual grating tooth.

FIG. 7 shows a side view of a conceptualized example of details of an interaction between light exiting the substrate 104 and an individual grating tooth 301. As shown in the example of FIG. 7, light travels through the substrate 104 at angle ° substrate with respect to a normal line drawn perpendicular to the plane of the substrate 104, and such light strikes the exit facet surface 702 at angle $\theta_{in}$ relative to a local normal line drawn perpendicular to the plane of the exit facet surface 702. The angle of incidence $\theta_{in}$ is set by the prism angle, $\theta_p$ (between the facet surface 702 and the plane of the substrate 104), and the direction of the diffracted orders (which is separated from the direction of the local normal line drawn perpendicular to a plane of the exit facet surface 702 by an angle $\theta_{out}$) is set by the width, $w_p$, of the prism base of a single grating tooth 301. In an example, $w_p$ and $\theta_p$ can be chosen such that if the light is p-polarized, the grating can be blazed such that light strikes the prism exit facet surface 702 at Brewster's angle and diffracts efficiently into the desired order, thus reducing or minimizing losses into the reflective orders and potentially rendering the anti-reflection coating 604 in FIG. 6 unnecessary. Note that, as shown in FIG. 7, the left sides of the prism teeth 301 in FIG. 7 can also be made to be parallel with the incoming light direction, such as can help reduce diffractive losses. Utilizing the grating with the angle incident light at or near Brewster's angle enables diffraction efficiencies near 55% to 60%, inclusive, such as determined by optical computer-based simulation for a silicon substrate 104 at a light wavelength of 1.5 μm. Note that this efficiency number could be considerably higher for a substrate 104 of a material having a lower index of refraction.

As shown in FIG. 3, there exists a reflected order of light that corresponds to specular reflection of light from the plane that would form the top surface of the substrate 104 if there were no grating teeth 301 cut into it. If the top surface and the bottom surface of the substrate 104 are parallel, then this reflected light can bounce twice, once off the top surface of the substrate 104 and once again off the bottom surface of the substrate 104, and can then re-encounter the grating, such as shown in FIG. 8.

Figure 8:
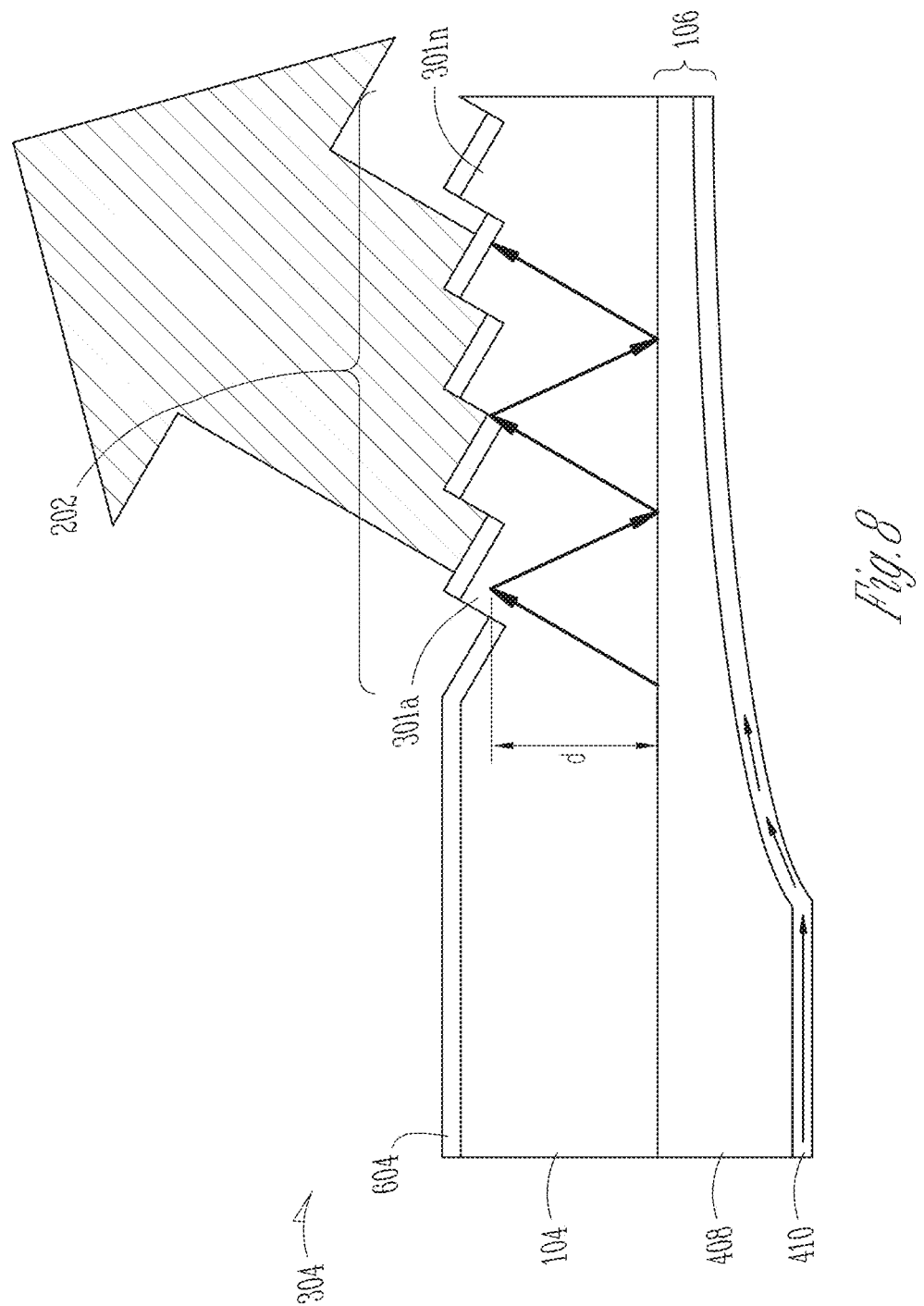
FIG. 8 is a side view showing an example in which a thickness d of the substrate can be selected to make re-reflected light re-encountering the grating in-phase with the light that had originally struck the grating.

FIG. 8 is a side view showing an example in which a thickness d of the substrate 104 can be selected to make re-reflected light re-encountering the grating in-phase with the light that had originally struck the grating. In this way, originally-incident light and re-reflected light at the grating can constructively combine, such as to create a well-defined light beam escaping the substrate 104. Of the original light that does not escape but is instead specularly reflected, this specularly-reflected light component will again re-encounter the grating in phase with the light that has already hit it, enhancing the light transmission of escaping light beam. In principle, this may lead to a significant increase in grating efficiency. A computer-based optical simulation, modeling a silicon substrate 104 and a light wavelength of 1.5 μm, indicates that as much as 15% of the reflected light may be recoverable for outcoupling with this technique, depending upon the design angle and order.

Such considerations in the previous paragraph do not apply to light-incoupling, when light enters the grating 202 from the air 304 side, at an input grating 202 of the LCW 106. In such a case, specularly reflected light would be lost to the air 304 unless an appropriate structure is put in place to capture it. Such incoming-from-air reflective light component capture can be accomplished by replacing the ARC layer 604, such as with a thicker multimode planar waveguide material directly above the input grating area 202a and receiving and coupling light into such multimode planar waveguide from the side, that is, laterally. Successive bounces from either the top surface or the bottom surface of such a thicker multimode waveguide can then allow for multiple chances for the laterally-received light to in-couple into the waveguide substrate 104, similar to the outcoupling technique shown in and described with respect to FIG. 8.

For example, for a silicon LC waveguide substrate 104 there is a large refractive index change at the substrate-air interface between the substrate 104 and air 304. This is partly a reason for the significant difference between the efficiency of the ARC layer 604 coated grating 202 shown in FIG. 6 as compared to the uncoated grating shown in FIG. 5.

Figure 9:
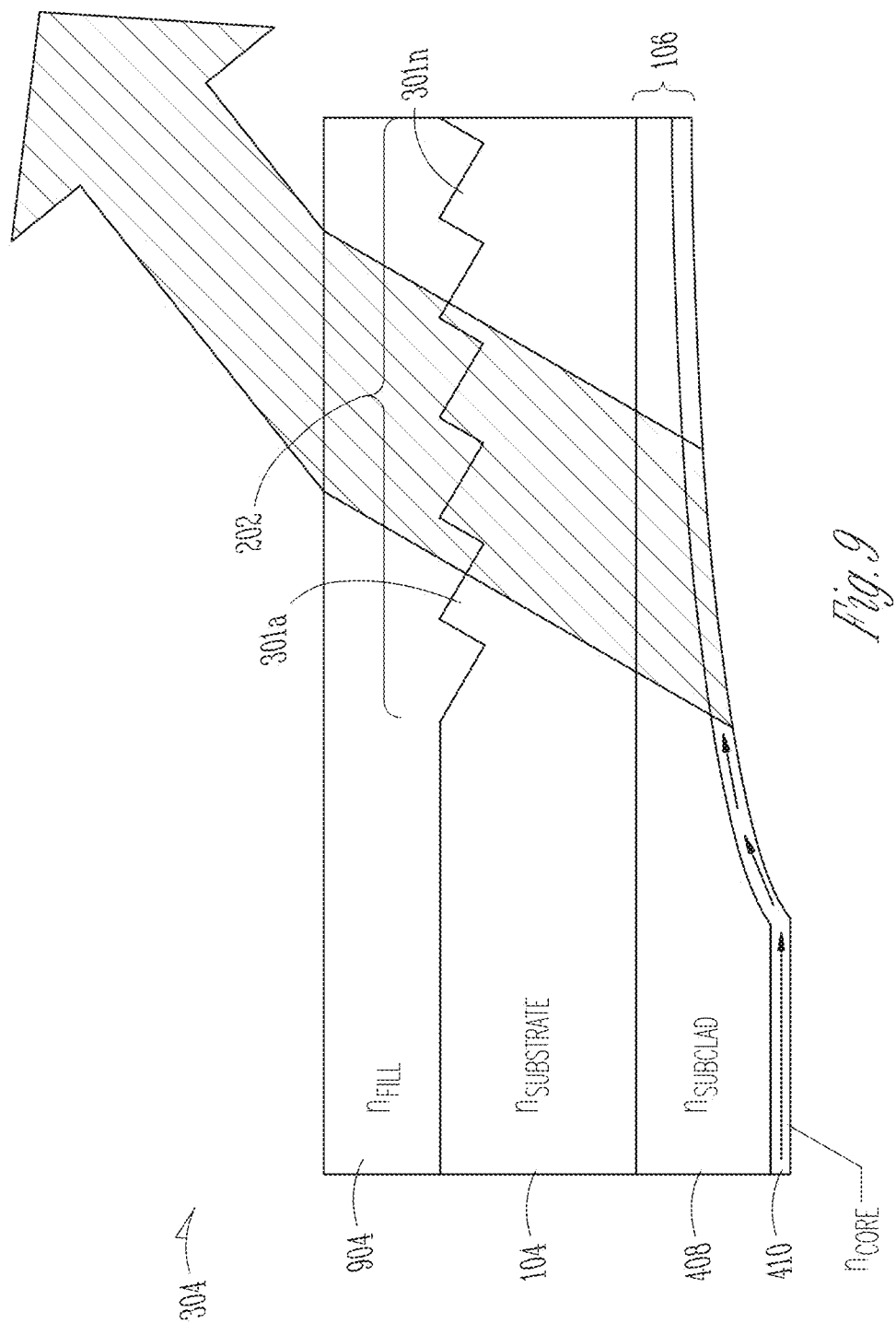
FIG. 9 shows a side view of an example in which such interfacial refractive index step can be softened, that is, made more gradual.
Figure 10:
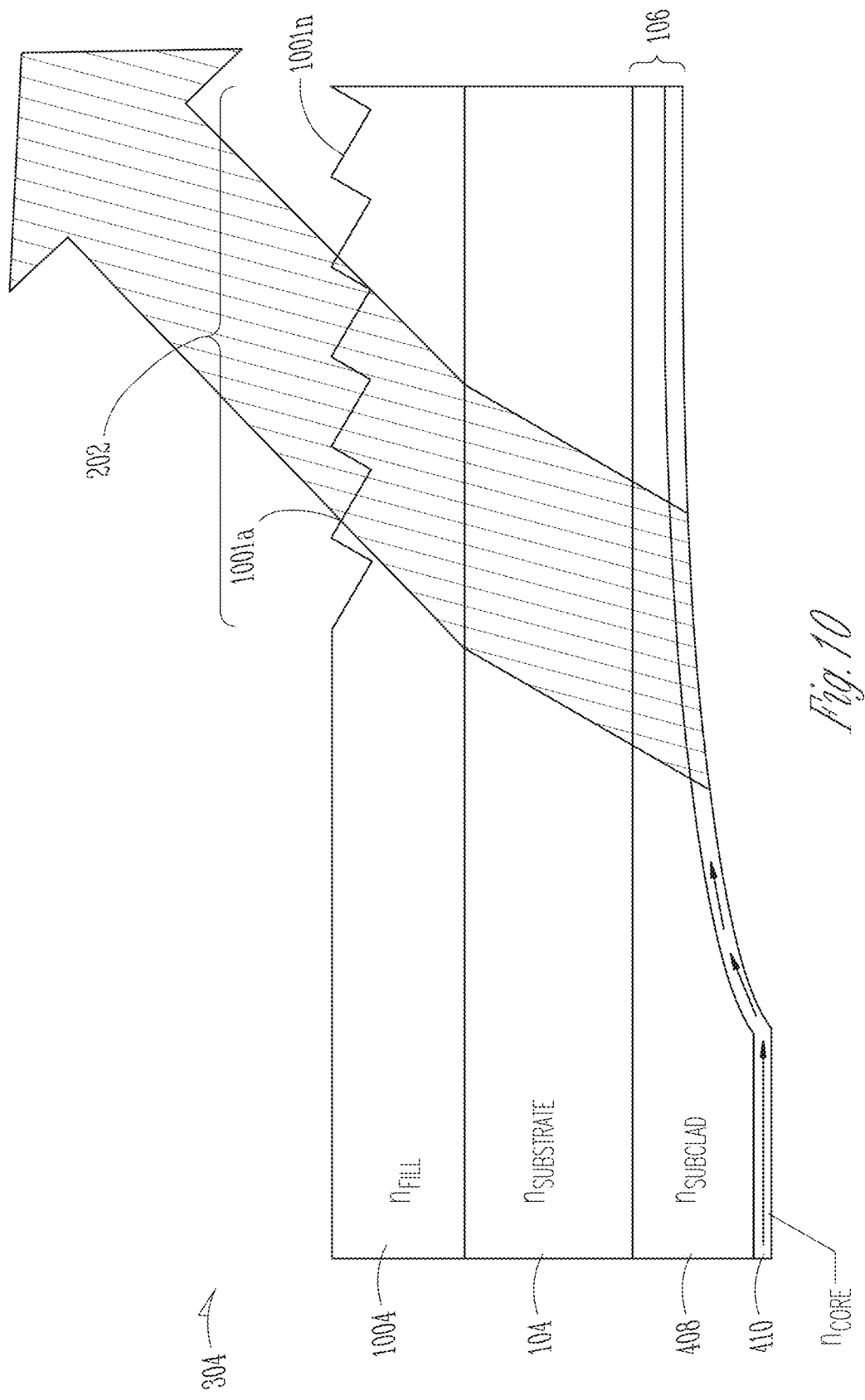
FIG. 10 shows a side view of another example of a configuration of a grating.

FIG. 9 shows a side view of an example in which such interfacial refractive index step can be softened, that is, made more gradual, such as by filling the grooves of the grating teeth 301 of the grating 202 with a fill material region 904 that can provide a lower refractive index, $n_{fill}$, as compared to the refractive index, $n_{substrate}$, of the silicon substrate 104. For example, a typical refractive index, $n_{fill}$, of the fill material region 904 can range from 1.4-2.0, inclusive. The material choice for the fill material region 904 can include, among other things, typical-index silicon oxide, higher-index glass, or a polymer material. Increasing the refractive index $n_{fill}$ of this fill material region 904 can also help allow an increase in pitch, d, between adjacent teeth 301, which pitch may range from as low as 0.5 μm up to 100 μm. By including the fill material region 904, increasing the pitch, d, between adjacent teeth 301, and when light strikes the grating teeth 301 at Brewster's angle, diffraction efficiencies at the silicon-glass interface between the substrate 104 and the fill material region 904 may reach values as high as 80% to 90%, inclusive, such as can be determined using a computer simulation and modeling the optics using a light wavelength of 1.5 μm. The grating 202 may redirect the light so that it is allowed to enter the lower refractive index fill material region 904 and then escape at the top interface between the fill material region 904 and an overlying air region 304. Here, light outcoupling efficiency can be further improved by adding an antireflection coating on top of the fill material region 904. Alternatively, the grating 202 can be configured to redirect light into the low index material region 904 at an angle that allows such light to then exit the fill material region 904 through a side facet or through an oblique facet similar to the oblique facets 102 shown in FIG. 1. This can be advantageous since the technique could allow as to use a thin silicon substrate 104 material adjacent to a thicker glass layer of fill material region 904, which could lead to a dramatic reduction in production costs since glass is cheaper than silicon. FIG. 10 shows a side view of another example of a configuration of a grating 202. In the example of FIG. 10, silicon substrate 104 can be placed in contact with a fill material 1004 that can have a refractive index, $n_{fill}$, that is lower than the refractive index, $n_{substrate}$, of the substrate 104 but higher than $N_{eff}$, the effective index for guided light in the LC waveguide 106. In this case, light can refract from the substrate 104 into the fill layer 1004, such as at a flat interface therebetween. The grating teeth 301 can be patterned on the top side of this fill material layer 1004. One potential limitation of this approach shown in FIG. 10 may be that there can be some reflective losses at the flat substrate-fill interface between the substrate 104 and the fill material 1004. A potential advantage of the approach shown in FIG. 10 is that it may be easier to manufacture the patterned grating teeth 301 on the lower refractive index material 1004 as compared to patterning grating teeth 301 on the silicon or other higher refractive index substrate material 104.

The manufacturing process of patterning the grating teeth 301 of a grating 202 can include using one or more techniques, such as, for example, grayscale lithography, a binary optical method, or nanoimprint lithography. The relative ease of these different techniques may be material-dependent, but can be usable for glass or silicon materials, such as those shown and described in various examples of this document.

Although various examples of such gratings 202 have been described above with an emphasis toward light transmission via such a grating 202, such a grating 202 can also be configured in a reflective architecture or arrangement. For example, rather than configuring a grating 202 to transmit the light directly into the air region 304, the grating 202 can be used to reflect the light back through the substrate 104, but in a way that allows the reflected light to hit lower waveguide layers, such as the subcladding layer 408 or the LC core layer 410 of the LCT waveguide 106 at an angle that is less than the total internal reflection (TIR) condition.

Figure 11:
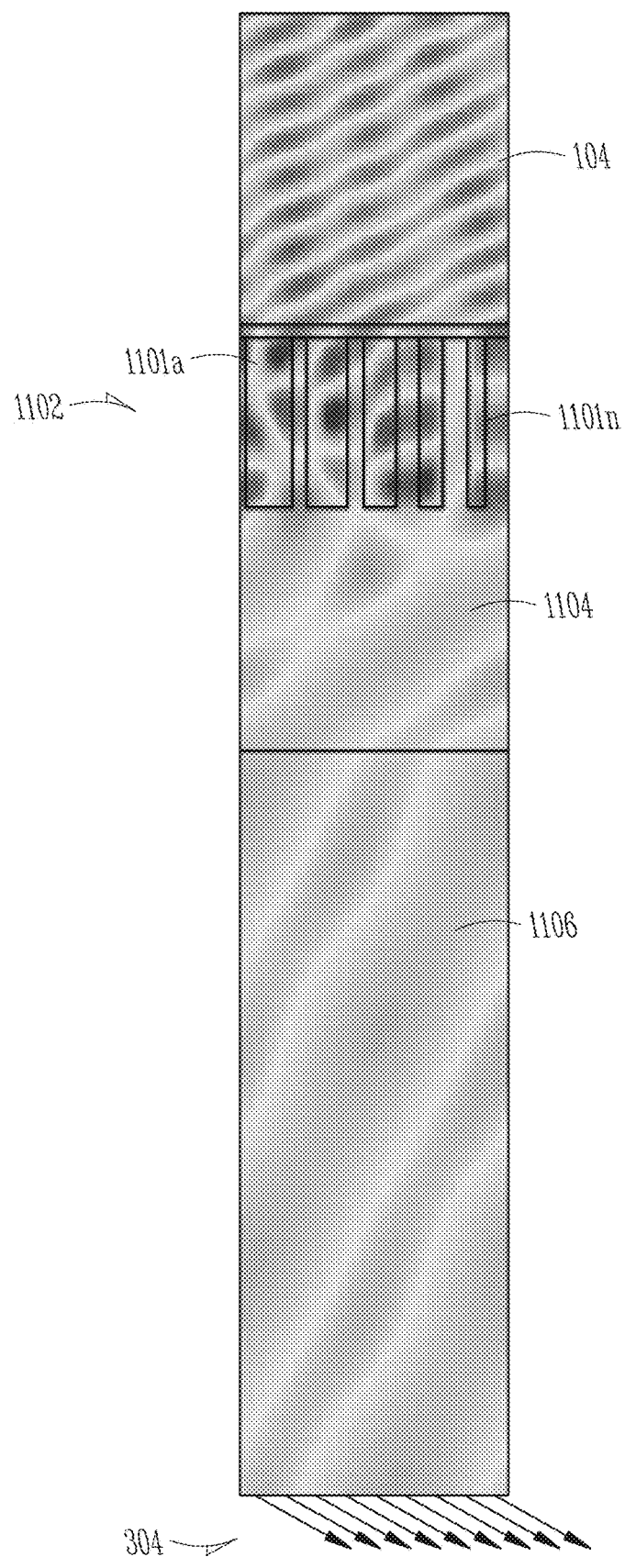
FIG. 11 is a side view of an example of a grating that can use a photonic crystal or metasurface technique, which need not be limited to a set of sub-aperture grating teeth, such as described above.

A possible big advantage of such a configuration is that it allows light to traverse the grating 202 twice (or to traverse a photonic crystal metastructure twice, if a photonic crystal metastructure such as shown in FIG. 11 is used in place of the grating 202), meaning that the same amount of phase control can be achieved with a smaller feature height. A possible limitation of such a configuration is that reflective losses could be considerable as the light traverses the set of lower waveguide layers.

Note that the quantitative grating efficiency numbers described above were all based on calculations for a silicon material as the substrate 104. Since silicon has a large refractive index (~3.4), the grating design can be complicated. But LCW devices can also be produced using a substrate 104 having a much lower refractive index. Such other lower refractive index materials for the substrate 104 can be useful for light wavelength in a range in which silicon is opaque, such as the near-infrared wavelengths of light. For light escape from a lower index of refraction material of the substrate 104, the grating design may be less complicated, thereby allowing producing a grating 202 with a higher light transmissive efficiency.

FIG. 11 is a side view of an example of a grating that can use a photonic crystal or metasurface technique, which need not be limited to a set of sub-aperture grating teeth 301, such as described above. It should be noted that the example in FIG. 11 is "flipped upside down" with respect to the example in FIG. 10, such that light escapes into an air region at the bottom of the example in FIG. 11. FIG. 11 also depicts conceptually a computer-simulated colorized distribution of the amplitude of the light, with peaks of the light wave shown in red, and troughs of the light wave shown in blue, with light traveling in a direction orthogonal to such peaks or troughs, and the wavelength of the light given by the distance between adjacent peaks or that between adjacent troughs.

In FIG. 11, using a photonic crystal metasurface approach, a grating 1102 can be constructed from and include a set of periodic or other structures that can provide sub-wavelength features 1101a . . . 1101n having a pitch between adjacent features 1101 that is smaller than the wavelength of light in the substrate material 104. Such sub-wavelength structures or features 1101 can take many forms, but it can be as simple as a set of small holes drilled into the surface of the silicon or other substrate 104, or pillars or grooves that can be separated adjacently by a sub-wavelength pitch. Here again, implementations of this type of grating 1102 may include one or more of a range of different materials, repetition length scales (or pitches), or choice of escape angle. In an example, the sub-wavelength features of the grating 1102 can be formed using a lithographic technique. Depending upon available lithographic techniques, the individual features 1101a . . . 1101n for a particular configuration of a grating 1102 such as shown in FIG. 11 may vary in width, such as between 50 nanometers and 750 nanometers inclusive, and may vary in depth, such as between 500 nanometers to 3.0 micrometers, inclusive. The sub-wavelength grating features 1101 may be formed using a material that can be selected from a range of different materials. Illustrative examples of such materials can include one or more dielectric materials, such as silicon, silicon nitride, silicon oxide, or other material useful in semiconductor manufacturing. Depending upon design order and angle, the subwavelength grating features 1101 can be arranged in a repetitive manner (or a more complex pattern) such as with a pitch between adjacent features 1101 that can vary between 0.5 micrometers and 20 micrometers, inclusive. As with the other examples described previously with respect to the previous FIGS, these subwavelength grating features 1101 such as shown in FIG. 11 can be left open to air 304 or can be filled with a higher-than-air refractive index fill material 1104 (e.g., having a refractive index n=1.4 to 2.0, inclusive). Providing a fill material 1104 other than air can help facilitate light exit at the interface between the fill material 1104 and the silicon substrate 104, e.g., as compared to exit directly into air. The fill material 1104 can also be sized and configured to allow light to ultimately refract at either a bottom or side surface of the fill material 1104 into air 304, or into an intermediate fill layer 1106, and then into air 304. The grating 1102 can include sub-wavelength features 1101 that can be configured either to transmit light from the substrate 104, or to reflect light back into the substrate 104, depending on the application. Initial computer-based simulations of the optics for an example of the architecture shown in FIG. 11 are promising, yielding a computer-simulated diffraction efficiency as high as 80% into air with a silicon oxide filler material 1104 between silicon teeth 1101 at a light wavelength of 1.5 µm in the silicon substrate 104.

Figure 12:
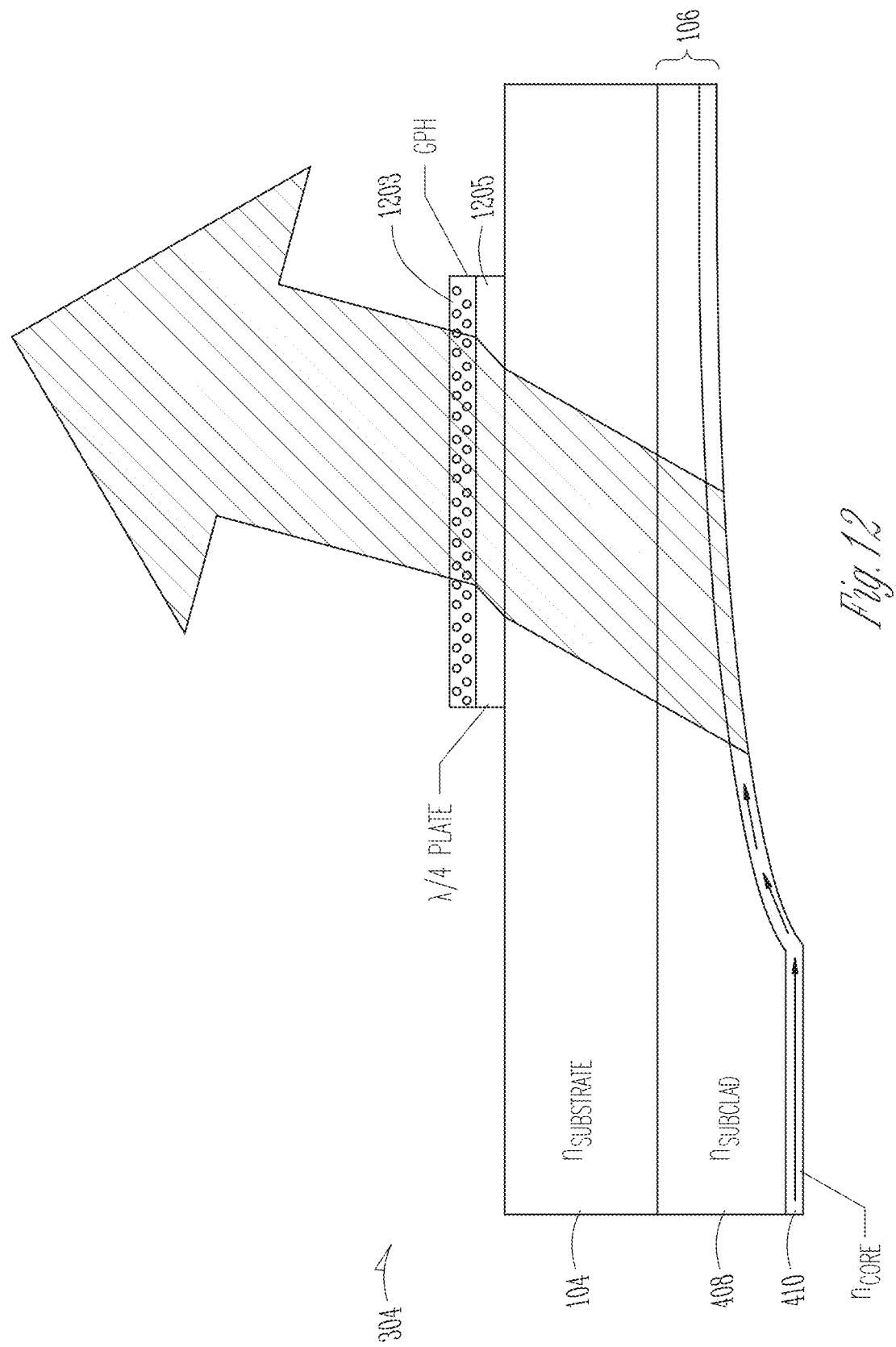
FIG. 12 shows a side view of another example using a geometric phased hologram (GPH) layer or a polarization grating (PG), such as for outcoupling or incoupling light with respect to a liquid crystal waveguide (LCW).

FIG. 12 shows a side view of another example of a grating 1202 such as for outcoupling light from a silicon or other substrate 104 associated with a LC waveguide 106. In FIG. 12, the grating 102 can include a geometric phased hologram (GPH) layer 1203 or a polarization grating (PG). The GPH layer 1203 can include or consist of a patterned polymer or LC material, such as can be configured to form a half-wave plate GPH layer 1203, such as can be used to redirect light with extremely high efficiency. The GPH layer 1203 may need incoming light having circular or other polarization. Circular or other polarization of the light from the substrate 104 can be obtained and provided to the GPH layer 1203, such as by including a quarter-wave plate 1205 between the substrate 104 and the GPH layer 1203, such as shown in FIG. 12. The quarter-wave plate 1205 can include or consist of a birefringent material having a refractive index larger than the effective refractive index $N_{eff}$ of the LC waveguide 106. For example, for a LC waveguide 106 having $N_{eff} \approx 1.7$, which allows one or more of several highly birefringent materials to be used for the quarter-wave plate 1205, including $LiNbO_3$ ($n_0 \approx 2.3$), $TiO_2$ ($n_0 \approx 2.6$), and SiC ($n_0 \approx 2.6$). Other examples of materials for the quarter wave plate layer 1205 can include Zircon ($n_0 \approx 2.0$) and sapphire ($n_0 \approx 1.8$). Note that "$n_0$" refers to the ordinary refractive index for the birefringent material itself.

For the GPH layer 1203, one of two conditions should be met. Either, as the first condition, the refractive index of the GPH layer 1203 should be larger than $N_{eff}$, so that light can propagate through this GPH layer 1203, or, as the second condition, the diffraction efficiency of the GPH layer 1203 should be high enough that the evanescent wave that penetrates into it during total internal reflection will scatter efficiently to create the desired output order of light emanating into overlying air from the GPH layer 1203.

Though the above description has emphasized certain examples with respect to outcoupling of light from an LC waveguide directly or indirectly into air, certain examples can also be applied to incoupling of light into the LC waveguide directly or indirectly from air, such as also explained above, with such explanation also including description of possible modifications for such incoupling.

Figure 13:
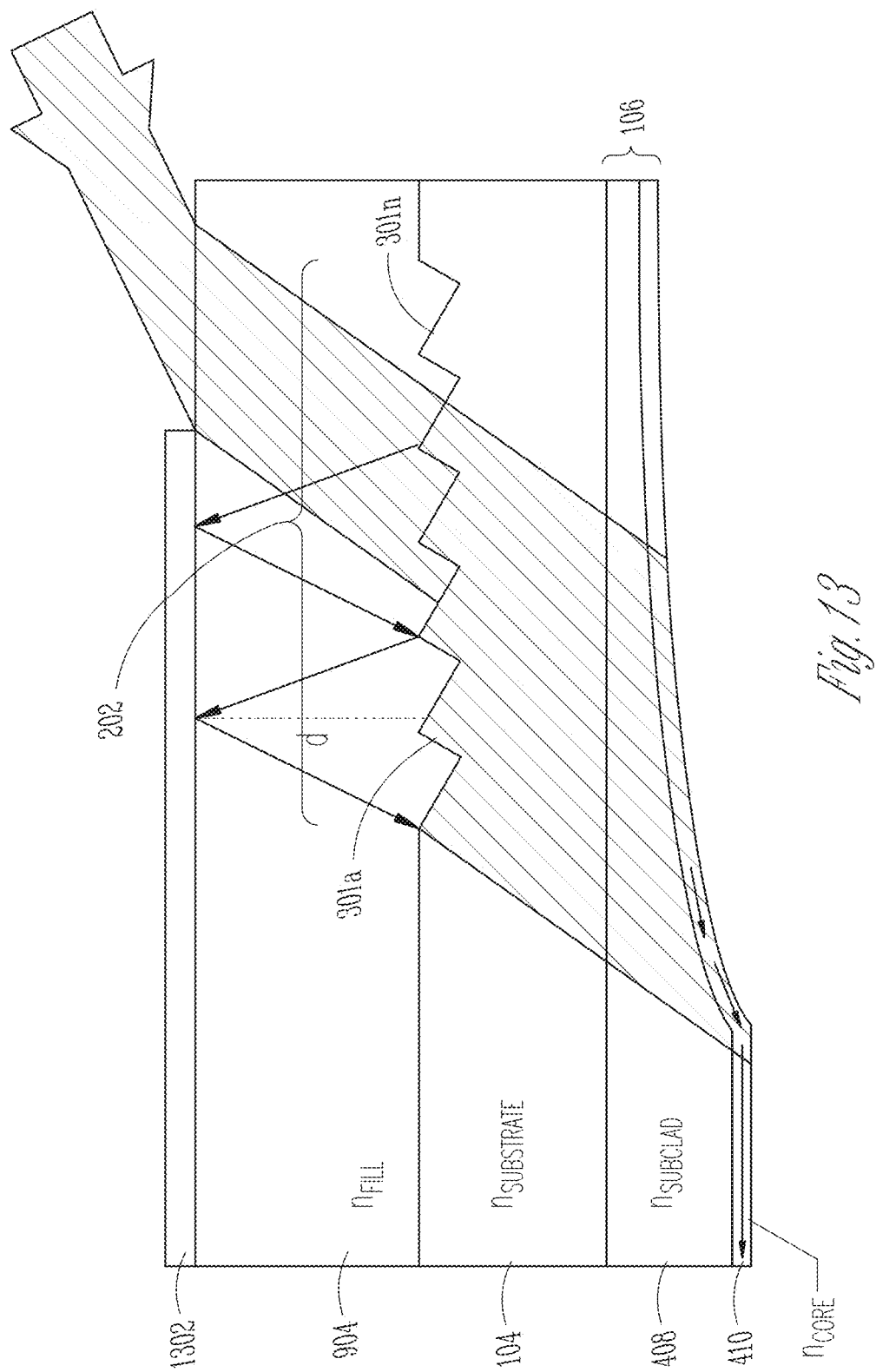
FIG. 13 shows an example of a configuration, similar in some respects to that shown in FIG. 9, but adapted for incoupling of light into the LC waveguide.

FIG. 13 shows an example of a configuration, similar in some respects to that shown in FIG. 9, but adapted for incoupling of light into the LC waveguide instead of outcoupling of light from an LC waveguide. In FIG. 13, an input beam of light can be refracted into a low-index fill layer 904, such as via an interface shown on the top, which may additionally be coated with an anti-reflective coating layer in the incoupling zone. The input beam passing through the fill layer 904 can be directed toward the grating teeth 301, which will launch some of the incoming light toward the LCW core 410. Some of the input beam will be specularly reflected off the grating teeth 301. A reflective mirror layer 1302 can be formed over the fill layer 904 of a thickness d that is selected such that light is in-phase after a round-trip from the grating teeth 301 to the mirror 1302 and back to the grating teeth 301, to further launch additional light toward the LCW core 410.

Figure 14:
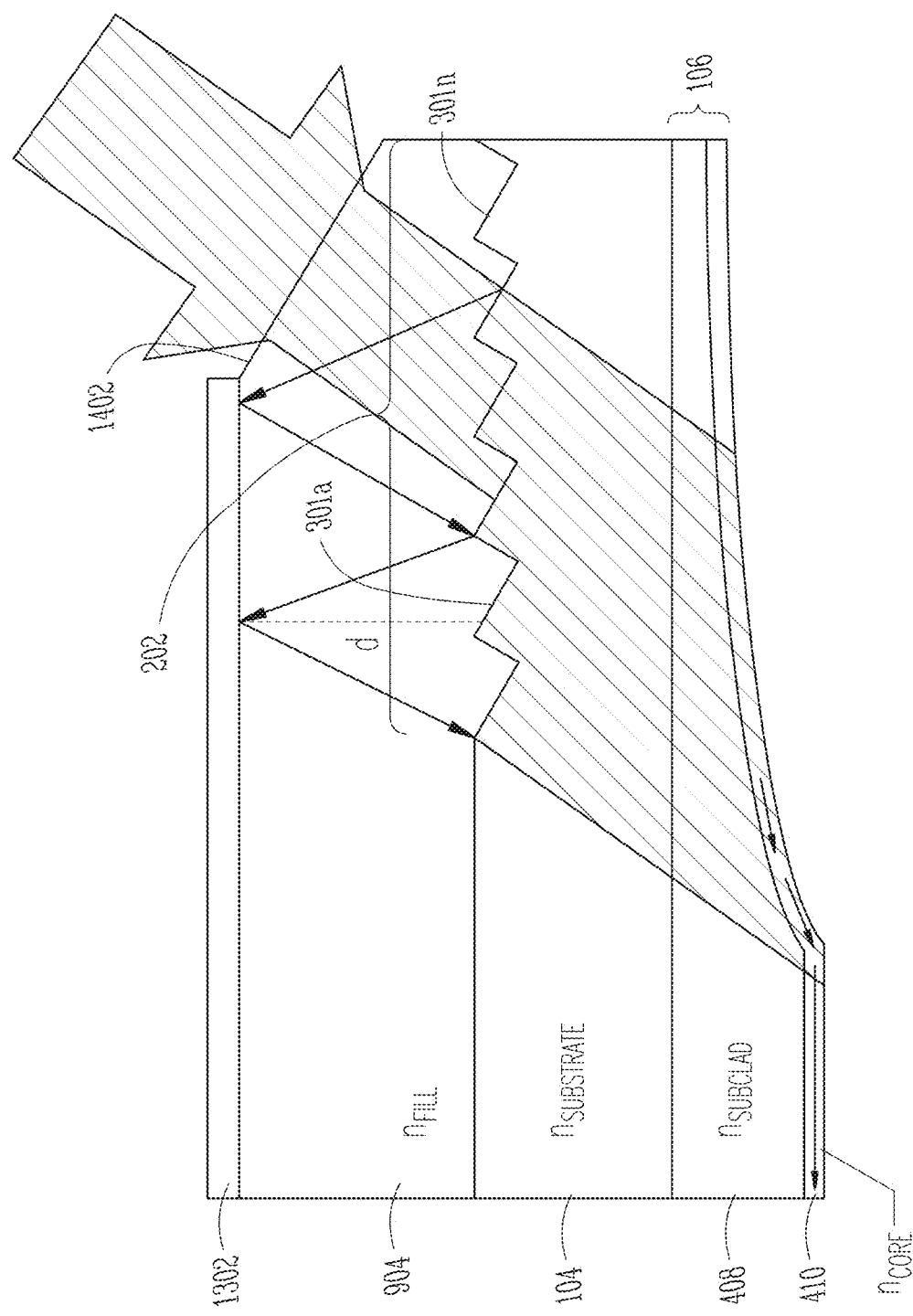
FIG. 14 shows an example similar to that of FIG. 13, but including an angled facet for light entry.

FIG. 14 shows an example similar to that of FIG. 13, but including an oblique facet 1402 that can be cut or otherwise formed into the fill layer 904, such as to allow the input light beam to enter the fill layer 904 at an angle that is nearly normal to the interface between the fill layer 904 and the overlying air 304 or other material.

Figure 15:
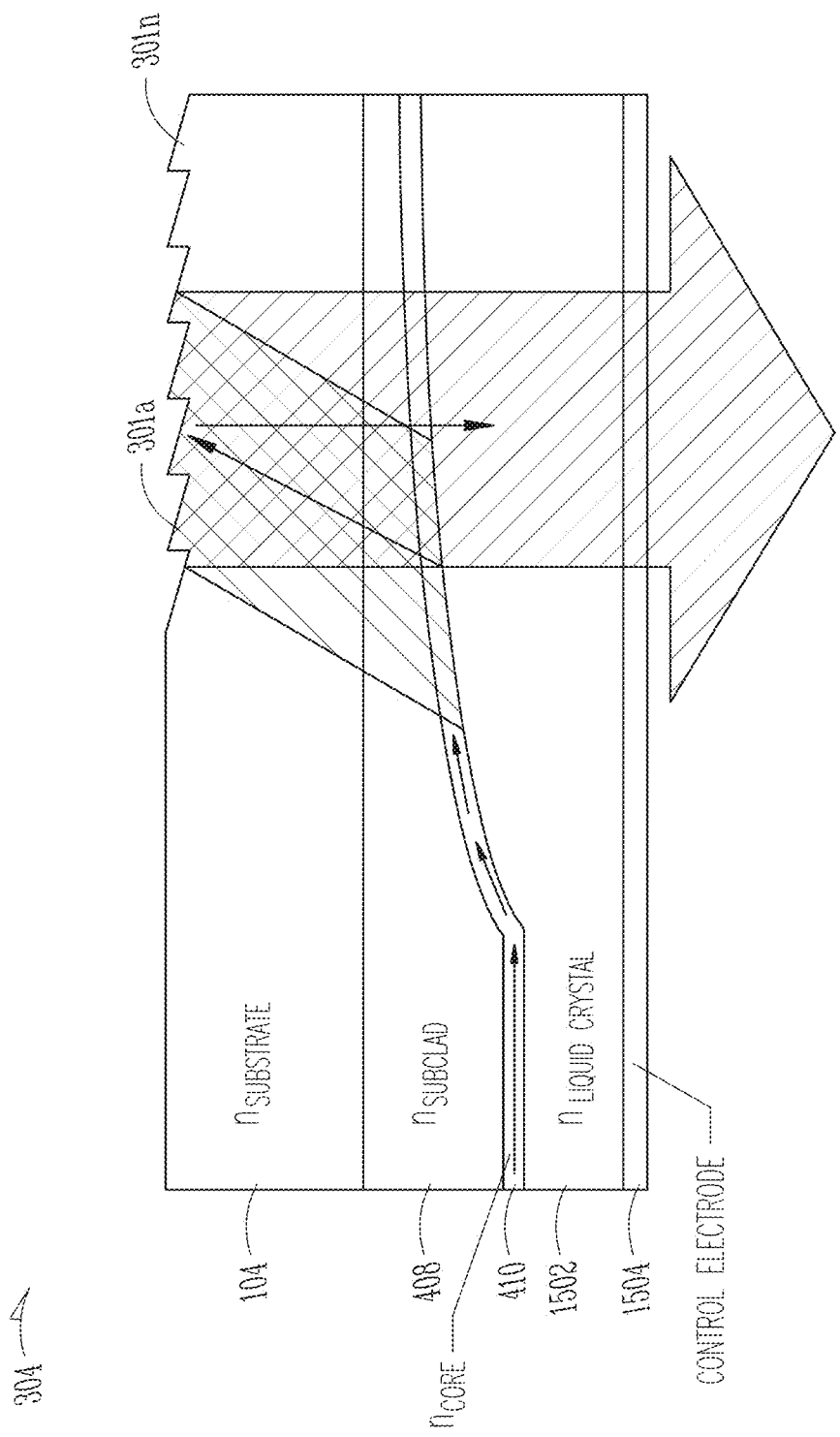
FIG. 15 shows an example in which the grating of sub-aperture light couplers can be used to reflect light, rather than pass light.

FIG. 15 shows an example in which the grating of sub-aperture light couplers 202 can be used to reflect light, rather than pass light, such as in an opposite direction toward an opposing or other surface for passing the light out into air or another material. In the example of FIG. 15, the sub-aperture teeth 301 can be configured to reflect light rather than to refract it. This can be accomplished such as by selecting the tooth blaze angle of the teeth 301a . . . 301n to correspond to a reflective order (mc) rather than to a refractive order. Reflection can also be enhanced by teeth 301, such as with a highly reflective material such as aluminum.

Such a configuration such as shown in FIG. 15 can be advantageous because reflections can tend to result in a larger steering angle than possible for refractions, such as for a given grating tooth 301 blaze angle. Therefore, the grating teeth 301 can be set to a shallower angle, which has been shown to result in lower diffractive losses in our calculations. However, the outcoupled light is forced to travel through all waveguide layers, including the liquid crystal cell 1502 after leaving the grating teeth 301. The outcoupled light will also traverse a control electrode 1504, such as can be used to control the LC layer 1502. The control electrode 1504 can be made from an electrical conductor that is transparent to the light being passed therethrough, such as an electrical conductor control electrode 1504 made from indium tin oxide (ITO). Such a light transmission path may result in some losses in optical power.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A Liquid Crystal Waveguide (LCW) system for light having an input wavelength and having an input beamsize defining an aperture characteristic of the system and providing at least one of sub-aperture incoupling or outcoupling of light, the system comprising:
   a Liquid Crystal Waveguide (LCW), including a generally planar LCW core, arranged to receive light provided from air via a light input zone for communication toward a light output zone to air; and
   a plurality of sub-aperture interfacial light couplers, associated with one of the light input zone from air into the LCW or the light output zone from the LCW to air; and
   wherein at least one of incoupling input light from air at the light input zone of the LCW or outcoupling output light to air at the light output zone of the LCW includes a plurality of sub-aperture interfacial light couplers having a surface dimension smaller than a beam peripheral outline of at least one of the input light from air or the output light to air;
   wherein the plurality of sub-aperture interfacial light couplers includes facets to form a grating arranged to re-reflect light from a facet of the grating in-phase to another facet of the grating.

2. The system of claim 1, wherein the plurality of sub-aperture interfacial light couplers includes at least one or any combination of:
   a plurality of rows of sub-aperture facets in a longitudinal direction of the LCW;
   a photonic crystal metasurface including rows of like sub-wavelength elements in a longitudinal direction of the LCW; or a geometric-phased hologram (GPH) including a sub-aperture birefringence variation in at least a longitudinal direction of the LCW to provide a phase shift to incident polarized light.

3. The system of claim 2, comprising the plurality of rows of sub-aperture facets in the longitudinal direction of the LCW arranged having a periodic pitch to form the grating.

4. The system of claim 1, wherein the grating is configured in a normal blazing configuration in which light entering or exiting on a topographically varying surface of the grating is perpendicular to a tooth facet surface and parallel to an adjacent tooth facet surface.

5. The system of claim 1, wherein the grating is configured such that light enters or exits a topographically varying surface of the grating at Brewster's angle.

6. The system of claim 1, wherein the grating is configured to provide a tooth spacing d between adjacent teeth in the grating such that for a selected integer mode, m, the following relationship holds $$N_{\mathit{eff}} = n_1 \sin\theta_1 = \frac{m\lambda}{d} + n_2 \sin\theta_2$$

wherein $N_{\mathit{eff}}$ is an effective refractive index of the mode, m; $n_1$ is an effective refractive index of a substrate region on a topographically non-varying side of the grating; $\theta_1$ is an angle of the light in the substrate with respect to a normal that is perpendicular to a plane of the grating; $n_2$ is an effective refractive index of a overlaying region on a topographically varying side of the grating; $\theta_2$ is an angle of light in the overlaying region with respect to the normal that is perpendicular to the plane of the grating.

7. The system of claim 1, wherein the LCW includes the LCW core, a light-coupling substrate, and a cladding region therebetween, wherein a thickness of the cladding region in at least one of the light input zone or the light output zone is less than a thickness of the cladding region between the light input zone and the light output zone.

8. The system of claim 7, wherein the grating is configured to communicate light with respect to the LCW core at an angle determined by the LCW in a light input zone or a light output zone of the LCW.

9. The system of claim 7, wherein a thickness, d, of the substrate in at least one of the light input zone or the light output zone is selected such that light reflected within the substrate by a facet of the grating is re-reflected in-phase to another facet of the grating.

10. The system of claim 7, comprising a fill layer overlaying a topographically varying side of the grating, wherein the fill layer has a refractive index value between a refractive index value of an underlying substrate and a refractive index value of an overlaying air or other region overlaying the fill layer.

11. The system of claim 1, wherein the grating is formed in a substrate region of the LCW.

12. The system of claim 1, wherein the grating is formed in a fill region overlaying a substrate region of the LCW.

13. The system of claim 2, wherein the plurality of sub-aperture interfacial light couplers includes a photonic crystal metasurface including rows of like sub-wavelength elements in a longitudinal direction of the LCW.

14. The system of claim 13, wherein the subwavelength elements comprise an arrangement of filled or unfilled holes formed in a substrate layer of the LCW providing a varying refractive index.

15. The system of claim 2, wherein the plurality of sub-aperture interfacial light couplers includes a geometric-phased hologram (GPH) including a sub-aperture birefringence variation in at least a longitudinal direction of the LCW to provide a phase shift to incident polarized light.

16. The system of claim 15, comprising a quarter-wave layer, having a thickness that is an integer multiple of a quarter wavelength of light therethrough, configured provide circular polarized light to the GPH, wherein the GPH comprises a half-wave layer, having a thickness that is an integer multiple of a half wavelength of light therethrough.

17. A Liquid Crystal Waveguide (LCW) system for light having an input wavelength and having an input beamsize defining an aperture characteristic of the system, the system comprising:
  a Liquid Crystal Waveguide (LCW), including a generally planar LCW core, arranged to receive light provided from air via a light input zone for communication toward a light output zone to air; and
  means for sub-aperture in-coupling from air or outcoupling of light to air with respect to the LCW in at least one of a light input zone of the LCW or a light output zone of the LCW; and
wherein at least one of incoupling input light from air at the light input zone of the LCW or outcoupling output light to air at the light output zone of the LCW includes a plurality of sub-aperture interfacial light couplers having a surface dimension smaller than a beam peripheral outline of at least one of the input light from air or the output light to air and including a grating re-reflecting light from a facet of the grating in-phase to another facet of the grating.

18. The system of claim 17, comprising means configured to direct light to or from the LCW core at Brewster's angle toward the means for sub-aperture incoupling or outcoupling of light.

19. A method comprising:
  communicating input light through a Liquid Crystal Waveguide (LCW) from a light input zone of the LCW from air to provide light output a light output zone of the LCW to air;
  at least one of incoupling input light at the light input zone of the LCW from air or outcoupling output light at the light output zone of the LCW to air using a plurality of sub-aperture interfacial light couplers including a grating having a surface dimension smaller than a beam peripheral outline of at least one of the input light from air or the output light to air and re-reflecting light reflected from a facet of the grating in-phase to another facet of the grating.

* * * * *